(12) United States Patent
Lee et al.

(10) Patent No.: US 11,066,547 B2
(45) Date of Patent: Jul. 20, 2021

(54) THERMOPLASTIC RESIN COMPOSITION, AND MOLDED ARTICLE PRODUCED THEREFROM

(71) Applicant: LOTTE ADVANCED MATERIALS CO., LTD., Yeosu-si (KR)

(72) Inventors: Eun Joo Lee, Uiwang-si (KR); Young Chul Kwon, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 112 days.

(21) Appl. No.: 16/466,822

(22) PCT Filed: Dec. 19, 2017

(86) PCT No.: PCT/KR2017/015045
§ 371 (c)(1),
(2) Date: Jun. 5, 2019

(87) PCT Pub. No.: WO2018/124592
PCT Pub. Date: Jul. 5, 2018

(65) Prior Publication Data
US 2019/0309156 A1    Oct. 10, 2019

(30) Foreign Application Priority Data

Dec. 30, 2016  (KR) .......................... 10-2016-0184165

(51) Int. Cl.
| C08L 51/04 | (2006.01) |
| C08K 3/22 | (2006.01) |
| C08K 5/134 | (2006.01) |
| C08K 5/526 | (2006.01) |
| C08L 25/06 | (2006.01) |
| C08L 25/12 | (2006.01) |
| C08K 5/5313 | (2006.01) |
| C08K 5/17 | (2006.01) |
| C08K 5/00 | (2006.01) |
| C08K 5/13 | (2006.01) |

(52) U.S. Cl.
CPC ............... *C08L 51/04* (2013.01); *C08K 3/22* (2013.01); *C08K 5/00* (2013.01); *C08K 5/13* (2013.01); *C08K 5/134* (2013.01); *C08K 5/17* (2013.01); *C08K 5/526* (2013.01); *C08K 5/5313* (2013.01); *C08L 25/06* (2013.01); *C08L 25/12* (2013.01); *C08K 2003/2296* (2013.01); *C08K 2201/006* (2013.01); *C08L 2205/02* (2013.01)

(58) Field of Classification Search
CPC . C08K 5/49; C08K 5/52; C08K 5/526; C08K 5/524; C08K 5/13; C08K 5/134; C08K 5/138; C08K 2003/2296
See application file for complete search history.

(56) References Cited

U.S. PATENT DOCUMENTS

| 9,902,850 B2 | 2/2018 | Kim et al. |
| 2009/0166593 A1 | 2/2009 | Kim et al. |

FOREIGN PATENT DOCUMENTS

| CN | 101921445 A | 12/2010 |
| JP | 09-157512 A | 6/1997 |
| JP | 11-263705 A | 9/1999 |
| JP | 2006-124588 A | 5/2006 |
| JP | 2009-161758 A | 7/2009 |
| KR | 10-2014-0068672 A | 6/2014 |
| KR | 10-2016-0001572 A | 9/2017 |
| WO | 2018/124592 A1 | 7/2018 |

OTHER PUBLICATIONS

JP 09157512 A machine translation (Jun. 1997).*
International Search Report in counterpart International Application No. PCT/KR20171015045 dated Mar. 30, 2018, pp. 1-4.
Extended Search Report in counterpart European Application No. 17886133.2 dated Jul. 8, 2020, pp. 1-6.

* cited by examiner

*Primary Examiner* — Ana L. Woodward
(74) *Attorney, Agent, or Firm* — Additon, Pendleton & Witherspoon, P.A.

(57) ABSTRACT

A thermoplastic resin composition of the present invention comprises: a thermal stabilizer including a rubber-modified vinyl-based graft copolymer and a phenol-based thermoplastic resin thermal stabilizer including an aromatic vinyl-based copolymer resin and a phosphorus-based thermal stabilizer; and a zinc oxide which has an average particle size of approximately 0.5 to approximately 3 μm and a specific surface area BET of approximately 1 to approximately 10 m²/g. The thermoplastic resin composition has excellent low-odor and antibacterial properties.

15 Claims, No Drawings ated States Patent
THERMOPLASTIC RESIN COMPOSITION, AND MOLDED ARTICLE PRODUCED THEREFROM

CROSS-REFERENCE TO RELATED APPLICATIONS

This application claims priority to and the benefit of International Application No. PCT/KR2017/015045, filed Dec. 19, 2017, which published as WO 2018/124592 on Jul. 5, 2018; and Korean Patent Application No. 10-2016-0184165 filed in the Korean Intellectual Property Office on Dec. 30, 2016, the entire disclosure of each of which is incorporated herein by reference.

TECHNICAL FIELD

The present invention relates to a thermoplastic resin composition and a molded article produced therefrom. More particularly, the present invention relates to a thermoplastic resin composition that exhibits good properties in terms of low-odor and antibacterial properties, and a molded article produced therefrom.

BACKGROUND ART

As a thermoplastic resin, a rubber-modified aromatic vinyl copolymer resin such as an acrylonitrile-butadiene-styrene copolymer resin (ABS resin) has good properties in terms of mechanical properties, processability, external appearance, and the like, and is broadly used as interior/exterior materials for electric/electronic products, automobiles, buildings, and the like.

In particular, despite low manufacturing costs and good moldability to be used as 3D printing materials, the rubber-modified aromatic vinyl copolymer resin has a disadvantage of generating a strong plastic odor during or after molding due to generation of an excess of out-gas (unreacted volatile organic compounds).

Moreover, when such resins are used for applications entailing physical contact with the body, such as medical equipment, toys, food containers, and the like, the resins are required to have antibacterial properties.

Therefore, there is a need for a thermoplastic resin composition that has good properties in terms of low-odor and antibacterial properties.

The background technique of the present invention is disclosed in Korean Patent Laid-open Publication No. 2016-0001572 and the like.

DISCLOSURE

Technical Problem

It is one object of the present invention to provide a thermoplastic resin composition exhibiting good properties in terms of low-odor and antibacterial properties.

It is another object of the present invention to provide a molded article formed of the thermoplastic resin composition.

The above and other objects of the present invention can be achieved by the present invention described below.

Technical Solution

One aspect of the present invention relates to a thermoplastic resin composition. The thermoplastic resin composition may include: a thermoplastic resin including a rubber-modified vinyl graft copolymer and an aromatic vinyl copolymer resin; a heat stabilizer including a phenol-based heat stabilizer and a phosphorus-based heat stabilizer; and zinc oxide having an average particle size of about 0.5 μm to about 3 μm and a BET specific surface area of about 1 $m^2/g$ to about 10 $m^2/g$.

In one embodiment, the thermoplastic resin composition may include: about 100 parts by weight of the thermoplastic resin including about 20 wt % to about 50 wt % of the rubber-modified vinyl graft copolymer and about 50 wt % to about 80 wt % of the aromatic vinyl copolymer resin; about 0.05 to about 2 parts by weight of the phenol-based heat stabilizer; about 0.05 to about 2 parts by weight of the phosphorus-based heat stabilizer; and about 0.3 to about 10 parts by weight of the zinc oxide.

In one embodiment, the rubber-modified vinyl graft copolymer may be prepared by graft polymerization of a monomer mixture including an aromatic vinyl monomer and a vinyl cyanide monomer to a rubber polymer.

In one embodiment, the aromatic vinyl copolymer resin may be a polymer of an aromatic vinyl monomer and a monomer copolymerizable with the aromatic vinyl monomer.

In one embodiment, the phenol-based heat stabilizer may include at least one selected from among octadecyl-3-(3,5-di-tert-butyl-4-hydroxyphenyl)propionate, and 2,2'-ethylidene-bis(4,6-di-tert-butylphenol).

In one embodiment, the phosphorus-based heat stabilizer may include at least one selected from among distearyl pentaerythritol diphosphite and diphenyl isooctyl phosphite.

In one embodiment, the zinc oxide may have a peak intensity ratio (B/A) of about 0 to about 1, where A indicates a peak in the wavelength range of 370 nm to 390 nm and B indicates a peak in the wavelength range of 450 nm to 600 nm in photoluminescence measurement.

In one embodiment, the zinc oxide may have a peak position (2θ) in the range of 35° to 37° and a crystallite size of about 1,000 Å to about 2,000 Å, in X-ray diffraction (XRD) analysis, as calculated by Equation 1:

$$\text{Crystallite size } (D) = \frac{K\lambda}{\beta \cos \theta} \quad \text{[Equation 1]}$$

where K is a shape factor, λ, is an X-ray wavelength, β is an FWHM value (degree) of an X-ray diffraction peak, and θ is a peak position degree.

In one embodiment, the phenol-based heat stabilizer and the phosphorus-based heat stabilizer may be present in a weight ratio (phenol-based heat stabilizer:phosphorus-based heat stabilizer) of about 1:1 to about 1:2.

In one embodiment, the heat stabilizer and the zinc oxide may be present in a weight ratio (heat stabilizer:zinc oxide) of about 1:0.75 to about 1:15.

In one embodiment, the thermoplastic resin composition may have a total volatile organic compound detection area of about 600 to about 2,000 area/g, as detected by HS-SPME GC/MS (head space solid-phase microextraction coupled to gas chromatography/mass spectrometry) after collecting volatile organic compounds at 120° C. for 300 min.

In one embodiment, the thermoplastic resin composition may have a residual volatile matter content of about 800 ppm to about 2,000 ppm, as measured at 250° C. by GC/MS (gas chromatography/mass spectrometry).

In one embodiment, the thermoplastic resin composition may have an antibacterial activity of about 2 to about 7 against each of *Staphylococcus aureus* and *Escherichia coli*, as measured on 5 cm×5 cm specimens inoculated with *Staphylococcus aureus* and *Escherichia coli*, respectively, in accordance with JIS Z 2801.

In one embodiment, the thermoplastic resin composition may be a material for 3D printing.

Another aspect of the present invention relates to a molded article. The molded article may be formed of the thermoplastic resin composition as set forth above.

Advantageous Effects

The present invention provides a thermoplastic resin composition that has good properties in terms of low-odor and antibacterial properties, and a molded article formed of the same.

BEST MODE

Hereinafter, embodiments of the present invention will be described in detail.

A thermoplastic resin composition according to the present invention includes (A) a thermoplastic resin including (A1) a rubber-modified vinyl graft copolymer and (A2) an aromatic vinyl copolymer resin; (B) a heat stabilizer including (B1) a phenol-based heat stabilizer and (B2) a phosphorus-based heat stabilizer; and (C) zinc oxide.

(A) Thermoplastic Resin

According to the present invention, the thermoplastic resin may be a rubber-modified vinyl copolymer resin including the (A1) rubber-modified vinyl graft copolymer and the (A2) aromatic vinyl copolymer resin.

(A1) Rubber-Modified Aromatic Vinyl Graft Copolymer

According to the embodiment of the invention, the rubber-modified vinyl graft copolymer may be obtained by graft polymerization of a monomer mixture including an aromatic vinyl monomer and a vinyl cyanide monomer to a rubber polymer. For example, the rubber-modified vinyl graft copolymer may be obtained by graft polymerization of the monomer mixture including the aromatic vinyl monomer and the vinyl cyanide monomer to the rubber polymer, in which the monomer mixture may further include a monomer for imparting processability and heat resistance, as needed. Here, polymerization may be performed by any typical polymerization method, such as emulsion polymerization, suspension polymerization, and the like. In addition, the rubber-modified vinyl graft copolymer may form a core (rubber polymer)-shell (copolymer of the monomer mixture) structure, without being limited thereto.

In some embodiments, the rubber polymer may include diene rubbers, such as polybutadiene, poly(styrene-butadiene), and poly(acrylonitrile-butadiene); saturated rubbers obtained by adding hydrogen to the diene rubbers; isoprene rubbers; $C_2$ to $C_{10}$ alkyl (meth)acrylate rubbers, a copolymer of a $C_2$ to $C_{10}$ alkyl (meth)acrylate and styrene; and ethylene-propylene-diene monomer terpolymer (EPDM). These may be used alone or as a mixture thereof. For example, the rubber polymer may include diene rubbers and (meth)acrylate rubbers. Specifically, the rubber polymer may include butadiene rubber and butyl acrylate rubber. The rubber polymer (rubber particle) may have an average particle diameter (Z-average) of about 0.05 μm to about 6 for example, about 0.15 μm to about 4 μm, specifically about 0.25 μm to about 3.5 μm. Within this range, the thermoplastic resin composition can have good properties in terms of impact resistance, external appearance, and the like.

In some embodiments, based on 100 wt % of the rubber-modified vinyl graft copolymer, the rubber polymer may be present in an amount of about 20 wt % to about 70 wt %, for example, about 25 wt % to about 60 wt %, and the monomer mixture (including the aromatic vinyl monomer and the vinyl cyanide monomer) may be present in an amount of about 30 to about 80 wt %, for example, about 40 to about 75 wt %. Within this range, the thermoplastic resin composition can have good properties in terms of impact resistance, external appearance, and the like.

In some embodiments, the aromatic vinyl monomer is a monomer copolymerizable with the rubber copolymer and may include, for example, styrene, α-methylstyrene, β-methylstyrene, p-methylstyrene, p-t-butyl styrene, ethyl styrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 10 wt % to about 90 wt %, for example, about 40 wt % to about 90 wt %, based on 100 wt % of the monomer mixture. Within this range, the thermoplastic resin composition can have good properties in terms of processability, impact resistance, and the like.

In some embodiments, the vinyl cyanide monomer is copolymerizable with the aromatic vinyl monomer, and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may be acrylonitrile and methacrylonitrile. The vinyl cyanide monomer may be present in an amount of about 10 wt % to about 90 wt %, for example, about 10 wt % to about 60 wt %, based on 100 wt % of the monomer mixture. Within this range, the thermoplastic resin composition can have good properties in terms of chemical resistance, mechanical properties, and the like.

Examples of the monomer for imparting processability and heat resistance may include (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

Examples of the rubber-modified vinyl graft copolymer may include a g-ABS copolymer obtained by grafting a styrene monomer (as the aromatic vinyl compound) and an acrylonitrile monomer (as the vinyl cyanide compound) to a butadiene-based rubber polymer, an acrylate-styrene-acrylate (g-ASA) copolymer obtained by grafting a styrene monomer (as the aromatic vinyl compound) and an acrylonitrile monomer (as the vinyl cyanide compound) to a butyl acrylate-based rubber polymer, and the like.

In some embodiments, the rubber-modified vinyl graft copolymer may be present in an amount of about 20 wt % to about 50 wt %, for example, about 25 wt % to about 45 wt %, based on 100 wt % of the thermoplastic resin (including the rubber-modified vinyl graft copolymer and the aromatic vinyl copolymer resin). Within this range, the thermoplastic resin composition can exhibit good properties in terms of impact resistance, fluidity (molding processability), external appearance, and balance therebetween.

(A2) Aromatic Vinyl Copolymer Resin

According to the embodiment of the invention, the aromatic vinyl copolymer resin may be an aromatic vinyl copolymer resin used for a typical rubber-modified vinyl graft copolymer resin. For example, the aromatic vinyl copolymer resin may be a polymer of a monomer mixture including an aromatic vinyl monomer and a monomer copolymerizable with the aromatic vinyl monomer, such as a vinyl cyanide monomer.

In some embodiments, the aromatic vinyl copolymer resin may be prepared by mixing the aromatic vinyl monomer and the monomer copolymerizable with the aromatic vinyl monomer, followed by polymerization. Here, polymerization may be carried out by any well-known polymerization method, such as emulsion polymerization, suspension polymerization, bulk polymerization, and the like.

Examples of the aromatic vinyl monomer may include styrene, α-methylstyrene, β-methylstyrene, p-methylstyrene, p-t-butyl styrene, ethyl styrene, vinylxylene, monochlorostyrene, dichlorostyrene, dibromostyrene, and vinyl naphthalene. These may be used alone or as a mixture thereof. The aromatic vinyl monomer may be present in an amount of about 20 wt % to about 90 wt %, for example, about 30 wt % to about 80 wt %, based on 100 wt % of the aromatic vinyl copolymer resin. Within this range, the thermoplastic resin composition can exhibit good properties in terms of impact resistance, fluidity, and the like.

In some embodiments, the monomer copolymerizable with the aromatic vinyl monomer may be a vinyl cyanide monomer, for example, acrylonitrile, methacrylonitrile, ethacrylonitrile, phenylacrylonitrile, α-chloroacrylonitrile, and fumaronitrile. These may be used alone or as a mixture thereof. The monomer copolymerizable with the aromatic vinyl monomer may be present in an amount of about 10 wt % to about 80 wt %, for example, about 20 wt % to about 70 wt %, based on 100 wt % of the aromatic vinyl copolymer resin. Within this range, the thermoplastic resin composition can exhibit good properties in terms of impact resistance, fluidity, and the like.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin exhibits good properties in terms of mechanical strength, formability, and the like.

In some embodiments, the aromatic vinyl copolymer resin may be present in an amount of about 50 wt % to about 80 wt %, for example, about 55 wt % to about 75 wt %, based on 100 wt % of the thermoplastic resin. Within this range, the thermoplastic resin composition can exhibit good properties in terms of impact resistance, fluidity (molding processability), and the like.

(B) Heat Stabilizer

According to the embodiment of the invention, the heat stabilizer serves to improve low-gloss and antibacterial properties of the thermoplastic resin composition (specimen) together with zinc oxide, and includes the (B1) phenol-based heat stabilizer and the (B2) phosphorus-based heat stabilizer.

(B1) Phenol-Based Heat Stabilizer

In some embodiments, the phenol-based heat stabilizer may include octadecyl-3-(3,5-di-tert-butyl-4-hydroxyphenyl)propionate, 2,2'-ethylidene-bis(4,6-di-tert-butylphenol), and combinations thereof. Preferably, octadecyl-3-(3,5-di-tert-butyl-4-hydroxyphenyl)propionate is used as the phenol-based heat stabilizer.

In some embodiments, the phenol-based heat stabilizer may be present in an amount of about 0.05 to about 2 parts by weight, for example, about 0.1 to about 1 part by weight, specifically about 0.2 to about 0.5 parts by weight, relative to about 100 parts by weight of the thermoplastic resin. Within this range, the thermoplastic resin composition can exhibit good properties in terms of low-odor and antibacterial properties.

(B2) Phosphorus-Based Heat Stabilizer

In some embodiments, the phosphorus-based heat stabilizer may include a phosphite compound, for example, distearyl pentaerythritol diphosphite, diphenyl isooctyl phosphite, and combinations thereof. Preferably, distearyl pentaerythritol diphosphite is used as the phosphorus-based heat stabilizer.

In some embodiments, the phosphorus-based heat stabilizer may be present in an amount of about 0.05 to about 2 parts by weight, for example, about 0.1 to about 1 part by weight, specifically 0.3 to 0.6 parts by weight, relative to about 100 parts by weight of the thermoplastic resin. Within this range, the thermoplastic resin composition can exhibit good properties in terms of low-odor and antibacterial properties.

In some embodiments, the phenol-based heat stabilizer (B1) and the phosphorus-based heat stabilizer (B2) may be present in a weight ratio (B1:B2) of about 1:1 to about 1:2, for example, about 1:1 to about 1:1.5. Within this range, the thermoplastic resin composition can exhibit further improved properties in terms of low-odor and antibacterial properties.

(C) Zinc Oxide

According to the present invention, the zinc oxide serves to improve low-odor and antibacterial properties of the thermoplastic resin composition together with the heat stabilizer, and may have an average particle diameter (D50) of about 0.5 μm to about 3 μm, for example, about 1 μm to about 3 μm, as measured using a particle size analyzer, a BET specific surface area of about 1 m²/g to about 10 m²/g, for example, about 1 m²/g to about 7 m²/g, and a purity of about 99% or higher. If these parameters of the zinc oxide are outside these ranges, the thermoplastic resin composition can have poor properties in terms of low-odor and antibacterial properties.

In some embodiments, the zinc oxide may have a peak intensity ratio (B/A) of about 0 to about 1, for example, about 0.01 to about 1, specifically about 0.01 to about 0.09, where A indicates a peak in the wavelength range of 370 nm to 390 nm and B indicates a peak in the wavelength range of 450 nm to 600 nm in photoluminescence measurement. Within this range, the thermoplastic resin composition can have further improved properties in terms of low-odor and antibacterial properties.

In some embodiments, the zinc oxide may have a peak position degree (2θ) in the range of 35° to 37° and a crystallite size of about 1,000 Å to about 2,000 Å, for example, about 1,200 Å to about 1,800 Å, in X-ray diffraction (XRD) analysis, as calculated by Scherrer's Equation (Equation 1) with reference to a measured FWHM value (full width at half maximum of a diffraction peak). Within this range, the thermoplastic resin composition can have good properties in terms of initial color, weather resistance, antibacterial properties, and the like.

$$\text{Crystallite size } (D) = \frac{K\lambda}{\beta\cos\theta} \qquad \text{[Equation 1]}$$

where K is a shape factor, λ is an X-ray wavelength, β is an FWHM value (degree), and θ is a peak position degree.

In some embodiments, the zinc oxide may have a photocatalyst efficiency of about 90% to about 99%, for example, about 91% to about 98.5%, as calculated by Equation 2. Within this range, the thermoplastic resin composition can have further improved low-odor properties.

$$\text{Photo-catalyst efficiency (\%)} = \frac{N1 - N2}{N1} \times 100 \quad \text{[Equation 2]}$$

where N1 is a UV absorption rate of a 5 ppm methylene blue solution at a wavelength of 660 nm and N2 is a UV absorption rate of the 5 ppm methylene blue solution at a wavelength of 660 nm, as measured after irradiating the 5 ppm methylene blue solution with UV light (UV-B) having a wavelength of 280 nm to 360 nm for 2 hours, with 1,000 ppm zinc oxide dipped in the methylene blue solution.

In some embodiments, the zinc oxide may be prepared by melting zinc particles in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., followed by heating the reactor to about 700° C. to about 800° C. for about 30 min to about 150 min, for example, about 60 min to about 120 min, while injecting nitrogen/hydrogen gas into the reactor, as needed.

In some embodiments, the zinc oxide may be present in an amount of about 0.3 to about 10 parts by weight, for example, about 0.5 to about 5 parts by weight, specifically about 1 to about 3 parts by weight, relative to about 100 parts by weight of the thermoplastic resin. Within this range, the thermoplastic resin composition can have good properties in terms of low-odor and antibacterial properties.

In some embodiments, the heat stabilizer (B) and the zinc oxide (C) may be present in a weight ratio (B:C) of about 1:0.75 to about 1:15, for example, about 1:0.75 to about 1:10. Within this range, the thermoplastic resin composition can have good properties in terms of low-odor and antibacterial properties.

According to one embodiment of the invention, the thermoplastic resin composition may further include additives used in typical thermoplastic resin compositions. Examples of the additives may include a flame retardant, fillers, an antioxidant agent, an anti-dripping agent, a lubricant, a release agent, a nucleating agent, an antistatic agent, a stabilizer, a pigment, a dye, and a mixture thereof, without being limited thereto. The additives may be present in an amount of about 0.001 to about 40 parts by weight, for example, about 0.1 to about 10 parts by weight, relative to about 100 parts by weight of the thermoplastic resin.

According to one embodiment of the invention, the thermoplastic resin composition may be prepared in pellet form by mixing the aforementioned components, followed by melt extrusion using a typical twin-screw extruder at about 200° C. to about 280° C., for example, about 220° C. to about 250° C. The thermoplastic resin composition has good properties in terms of low-odor, antibacterial properties, impact resistance, fluidity (formability), and balance therebetween to be advantageously applied to materials for 3D printing (filament) and the like.

In some embodiments, the thermoplastic resin composition may have a total volatile organic compound detection area of about 600 to about 2,000 area/g, for example, about 700 to about 1,300 area/g, as detected by HS-SPME GC/MS (head space solid-phase microextraction coupled to gas chromatography/mass spectrometry) after collecting volatile organic compounds at 120° C. for 300 min.

In some embodiments, the thermoplastic resin composition may have a residual volatile matter content of about 800 ppm to about 2,000 ppm, for example, about 900 to about 1,500 ppm, as measured at 250° C. by GC/MS (gas chromatography/mass spectrometry).

In some embodiments, the thermoplastic resin composition may have an antibacterial activity of about 2 to about 7, for example, about 4 to about 6.5, against each of *Staphylococcus aureus* and *Escherichia coli*, as measured on 5 cm cm specimens in accordance with JIS Z 2801 after inoculation with *Staphylococcus aureus* and *Escherichia coli*, respectively, followed by culturing under conditions of 35° C. and 90% RH for 24 hours.

A molded article according to the present invention is produced from the thermoplastic resin composition. The thermoplastic resin composition may be prepared in pellet form and the prepared pellets may be produced into various molded articles (products) by various molding methods, such as injection molding, extrusion, vacuum molding, and casting. Such molding methods are well known to those skilled in the art. The molded articles exhibit good properties in terms of low-gloss, antibacterial properties, impact resistance, fluidity (formability), and balance therebetween, and thus may be used in various fields, such as articles produced by 3D printing, materials for medical products, and interior/exterior materials for electric/electronic products, and the like.

MODE FOR INVENTION

Next, the present invention will be described in more detail with reference to some examples. It should be understood that these examples are provided for illustration only and are not to be construed in any way as limiting the invention.

EXAMPLE

Details of components used in Examples and Comparative Examples are as follows.

(A) Thermoplastic resin (A1-1) Rubber-modified aromatic vinyl graft copolymer

A g-ABS copolymer obtained by grafting 55 wt % of a mixture comprising styrene and acrylonitrile (weight ratio: 75/25) to 45 wt % of butadiene rubber having a Z-average particle diameter of 310 nm was used.

(A1-2) Rubber-modified aromatic vinyl graft copolymer

A g-ASA copolymer obtained by grafting 55 wt % of a mixture comprising styrene and acrylonitrile (weight ratio: 75/25) to 45 wt % of butyl acrylate rubber having a Z-average particle diameter of 310 nm was used.

(A2) Aromatic vinyl copolymer resin

A SAN resin (weight average molecular weight: 130,000 g/mol) obtained through polymerization of 71 wt % of styrene and 29 wt % of acrylonitrile was used.

(B) Heat stabilizer (B1) Octadecyl-3-(3,5-di-tert-butyl-4-hydroxyphenyl) propionate was used as a phenol-based heat stabilizer.

(B2) Distearyl pentaerythritol diphosphite was used as a phosphorus-based heat stabilizer.

(C) Zinc oxide (C1) Zinc oxide having an average particle diameter, a BET surface area, a purity, and a peak intensity ratio (B/A) of peak B in the wavelength range of 450 nm to 600 nm to peak A in the wavelength range of 370 nm to 390 nm in photoluminescence measurement, and a crystallite size as listed in Table 1 was used.

(C2) Zinc oxide (Product Name: RZ-950, Ristechbiz Co., Ltd.) having an average particle diameter, a BET surface area, a purity, and a peak intensity ratio (B/A) of peak B in the wavelength range of 450 nm to 600 nm to peak A in the wavelength range of 370 nm to 390 nm in photoluminescence measurement, and a crystallite size as listed in Table 1 was used.

TABLE 1

|  | (C1) | (C2) |
|---|---|---|
| Average particle diameter (μm) | 1.0 | 1.1 |
| BET surface area (m²/g) | 6 | 15 |
| Purity (%) | 99.2 | 97 |
| PL peak intensity ratio (B/A) | 0.05 | 9.8 |
| Crystallite size (Å) | 1,229 | 503 |

Property Measurement (1) Average particle diameter (unit: μm): Average particle diameter (volume average) was measured using a particle size analyzer (Laser Diffraction Particle size analyzer LS I3 320, Beckman Coulter Co., Ltd.).

(2) BET surface area (unit: m²/g): BET surface area was measured by a nitrogen gas adsorption method using a BET analyzer (Surface Area and Porosity Analyzer ASAP 2020, Micromeritics Co., Ltd.).

(3) Purity (unit: %): Purity was measured by thermogravimetric analysis (TGA) based on the weight of the remaining material at 800° C.

(4) PL peak intensity ratio (B/A): Spectrum emitted upon irradiation of a specimen using a He—Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak B in the wavelength range of 450 nm to 600 nm to peak A in the wavelength range of 370 nm to 390 nm was measured. Here, an injection molded specimen was irradiated with laser beams without separate treatment upon PL analysis and zinc oxide powder was compressed in a pelletizer having a diameter of 6 mm to prepare a flat specimen.

(5) Crystallite size (unit: Å): Crystallite size was measured using a high-resolution X-ray diffractometer (PRO-MRD, X'pert Co., Ltd.) at a peak position degree (2θ) in the range of 35° to 37° and calculated by Scherrer's Equation (Equation 1) with reference to a measured FWHM value (full width at half maximum of a diffraction peak). Here, both a specimen in powder form and an injection molded specimen could be used, and for more accurate analysis, the injection molded specimen was subjected to heat treatment at 600° C. in air for 2 hours to remove a polymer resin before XRD analysis.

$$\text{Crystallite size } (D) = \frac{K\lambda}{\beta \cos \theta} \quad \text{[Equation 2]}$$

where K is a shape factor, λ, is an X-ray wavelength, β is an FWHM value (degree), and θ is a peak position degree.

Examples 1 to 5 and Comparative Examples 1 to 3

The above components were weighed in amounts as listed in Table 2 and subjected to extrusion at 230° C., thereby preparing pellets. Extrusion was performed using a twin-screw extruder (L/D=36, Φ: 45 mm). The prepared pellets were dried at 80° C. for 2 hours or more and injection-molded in a 6 oz. injection molding machine (molding temperature: 230° C., mold temperature: 60° C.), thereby preparing specimens. The prepared specimens were evaluated as to the following properties by the following method, and results are shown in Table 2.

Property Evaluation (1) Low-odor evaluation (Total volatile organic compound (TVOC), unit: Area/g): A detection area of volatile organic compounds collected at 120° C. for 300 min was measured at 120° C. for 5 hours by HS-SPME GC/MS (headspace solid-phase microextraction coupled to gas chromatography/mass spectrometry). Measurement conditions and a pretreatment method were as follows.

Measurement Condition

| | Parameters | Conditions |
|---|---|---|
| HSS | Headspace Sampler | Agilent Technologies G1888 |
| | Method | Required conditions (Temperature: 120° C., Collecting time 300 min) |
| GC | Column | Carbowax 20M (ID 0.32 mm, L 25 m, film thickness 0.30 μm) |
| | Moving phase | He |
| | Pressure | 7.8 psi |
| | Flow | 2.0 ml/min (Average velocity = 32 cm/sec) |
| | Split | Split ratio = 5:1 |
| | Method | 40° C. 3 min → 200° C. 4 min (R = 12° C./min) |
| | Detector | FID |

Pretreatment Method

1) A sample was placed in an HSS vial (Powder 20 mg, Pellet 2 g).

2) Headspace sampler conditions were set as above.

(2) Low-odor evaluation (residual volatile matter (RTVM) content, unit: ppm): Residual volatile matter content was measured at 250° C. by GC/MS (gas chromatography/mass spectrometry). Measurement conditions and a pretreatment method were as follows.

Measurement Condition

| Parameter | Conditions |
|---|---|
| Column | INNOWAX (length 30 M, ID 0.53 mm, film thickness 0.88 μm) |
| Temp. Prog. | 40° C. (4 min) → 250° C. (4 min) (R = 20° C./min) |
| Flow rate | 10 mL/min (Head-pressure 6.57 Pa) |
| Split ratio | 5:1 |
| Detector | FID |
| Injection Vol. | 1 μl |
| Injector temp. | 150° C. |

Pretreatment Method 1) 0.2 to 0.3 g of a sample was placed in a 20 mL vial.

2) 9 mL NMP was added to the vial and dissolved therein using a shaker for 10 hours or more.

3) 1 mL of an internal standard solution was added thereto, followed by stirring. The resulting material was filtered through a 0.45 μm filter.

(3) Antibacterial activity: Antibacterial activity was measured on a 5 cm×5 cm specimen obtained by inoculation with each of *Staphylococcus aureus* and *Escherichia coli*, followed by culturing under conditions of 35° C. and 90% RH for 24 hours, in accordance with JIS Z 2801.

TABLE 2

| | | Example | | | | | Comparative Example | | |
|---|---|---|---|---|---|---|---|---|---|
| | | 1 | 2 | 3 | 4 | 5 | 1 | 2 | 3 |
| (A) (wt %) | (A1-1) | 30 | 30 | 30 | — | — | 30 | 30 | — |
| | (A1-2) | — | — | — | 40 | 40 | — | — | 40 |
| | (A2) | 70 | 70 | 70 | 60 | 60 | 70 | 70 | 60 |
| (B) (parts by weight) | (B1) | 0.2 | 1.0 | 0.1 | 0.2 | 0.2 | — | 0.5 | 0.2 |
| | (B2) | 0.3 | 1.0 | 0.1 | 0.3 | 0.3 | 0.5 | — | 0.3 |
| (C) (parts by weight) | (C1) | 1.5 | 1.5 | 1.5 | 5.0 | 0.5 | 1.5 | 1.5 | — |
| | (C2) | — | — | — | — | — | — | — | 1.5 |
| TVOC detection area (area/g) | | 700 | 900 | 1,000 | 1,200 | 1,300 | 9,000 | 10,000 | 17,000 |
| RTVM content (ppm) | | 1,000 | 1,100 | 1,000 | 1,500 | 1,400 | 2,000 | 1,800 | 2,200 |
| Antibacterial activity (*Escherichia coli*) | | 4.6 | 4.6 | 4.6 | 4.6 | 4.6 | 4.6 | 4.6 | 2.0 |
| Antibacterial activity (*Staphylococcus aureus*) | | 6.3 | 6.3 | 6.3 | 6.3 | 6.3 | 6.3 | 6.3 | 2.5 |

*Parts by weight: (A) Parts by weight relative to 100 parts by weight

From the results, it can be seen that the thermoplastic resin composition according to the present invention has good properties in terms of low-odor and antibacterial properties.

Conversely, the composition (Comparative Example 1) prepared without using the phenol-based heat stabilizer (B1) and the composition (Comparative Example 2) prepared without using the phosphorus-based heat stabilizer (B2) suffered from significant deterioration in low-odor, thereby generating severe odor upon formation of pellets. In addition, the composition (Comparative Example 3) prepared using zinc oxide (C2) instead of zinc oxide (C1) of the present invention suffered from deterioration in low-odor and antibacterial properties.

It should be understood that various modifications, changes, alterations, and equivalent embodiments can be made by those skilled in the art without departing from the spirit and scope of the present invention.

The invention claimed is:

1. A thermoplastic resin composition comprising:
   about 100 parts by weight of a thermoplastic resin comprising about 20 wt % to about 50 wt % of a rubber-modified vinyl graft copolymer and about 50 wt % to about 80 wt % of an aromatic vinyl copolymer;
   a heat stabilizer comprising about 0.05 to about 2 parts by weight of a phenol-based heat stabilizer and about 0.05 to about 2 parts by weight of a phosphorus-based heat stabilizer; and
   about 0.3 to about 10 parts by weight of zinc oxide having an average particle size of about 0.5 µm to about 3 µm and a BET specific surface area of about 1 m$^2$/g to about 10 m$^2$/g.

2. The thermoplastic resin composition according to claim 1, wherein the rubber-modified vinyl graft copolymer is prepared by graft polymerization of a monomer mixture comprising an aromatic vinyl monomer and a vinyl cyanide monomer to a rubber polymer.

3. The thermoplastic resin composition according to claim 1, wherein the aromatic vinyl copolymer resin is a polymer of an aromatic vinyl monomer and a vinyl cyanide monomer.

4. The thermoplastic resin composition according to claim 1, wherein the phenol-based heat stabilizer comprises octadecyl-3-(3,5-di-tert-butyl-4-hydroxyphenyl)propionate and/or 2,2'-ethylidene-bis(4,6-di-tert-butylphenol).

5. The thermoplastic resin composition according to claim 1, wherein the phosphorus-based heat stabilizer comprises distearyl pentaerythritol diphosphite and/or diphenyl isooctyl phosphite.

6. The thermoplastic resin composition according to claim 1, wherein the zinc oxide has a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement.

7. The thermoplastic resin composition according to claim 1, wherein the zinc oxide has a peak position (2θ) in the range of 35° to 37° and a crystallite size of about 1,000 Å to about 2,000 Å, in X-ray diffraction (XRD) analysis, as calculated by Equation 1:

$$\text{Crystallite size } (D) = \frac{K\lambda}{\beta \cos\theta} \quad \text{[Equation 1]}$$

where K is a shape factor, λ is an X-ray wavelength, β is an FWHM value (degree) of an X-ray diffraction peak, and θ is a peak position degree.

8. The thermoplastic resin composition according to claim 1, wherein the phenol-based heat stabilizer and the phosphorus-based heat stabilizer are present in a weight ratio (phenol-based heat stabilizer:phosphorus-based heat stabilizer) of about 1:1 to about 1:2.

9. The thermoplastic resin composition according to claim 1, wherein the heat stabilizer and the zinc oxide are present in a weight ratio (heat stabilizer:zinc oxide) of about 1:0.75 to about 1:15.

10. The thermoplastic resin composition according to claim 1, wherein the thermoplastic resin composition has a total volatile organic compound detection area of about 600 to about 2,000 area/g, as detected by HS-SPME GC/MS (head space solid-phase microextraction coupled to gas chromatography/mass spectrometry) after collecting volatile organic compounds at 120° C. for 300 min.

11. The thermoplastic resin composition according to claim 1, wherein the thermoplastic resin composition has a residual volatile matter content of about 800 ppm to about 2,000 ppm, as measured at 250° C. by GC/MS (gas chromatography/mass spectrometry).

12. The thermoplastic resin composition according to claim 1, wherein the thermoplastic resin composition has an antibacterial activity of about 2 to about 7 against each of *Staphylococcus aureus* and *Escherichia coli*, as measured on 5 cm×5 cm specimens inoculated with *Staphylococcus aureus* and *Escherichia coli*, respectively, in accordance with JIS Z 2801.

13. The thermoplastic resin composition according to claim 1, wherein the thermoplastic resin composition is a material for 3D printing.

14. A molded article formed of the thermoplastic resin composition according to claim 1.

15. A thermoplastic resin composition comprising:
a thermoplastic resin comprising a rubber-modified vinyl graft copolymer and an aromatic vinyl copolymer;
a heat stabilizer comprising a phenol-based heat stabilizer and a phosphorus-based heat stabilizer; and
zinc oxide having an average particle size of about 0.5 μm to about 3 μm and a BET specific surface area of about 1 $m^2/g$ to about 10 $m^2/g$,
wherein the thermoplastic resin composition has a total volatile organic compound detection area of about 600 to about 2,000 area/g, as detected by HS-SPME GC/MS (head space solid-phase microextraction coupled to gas chromatography/mass spectrometry) after collecting volatile organic compounds at 120° C. for 300 min.

* * * * *